(12) United States Patent
Zhang et al.

(10) Patent No.: US 10,830,032 B1
(45) Date of Patent: Nov. 10, 2020

(54) AIR SOURCE SYSTEM FOR SUPPLYING AIR TO A TURBINE ENGINE BY FRACTURING MANIFOLD EQUIPMENT

(71) Applicant: YANTAI JEREH PETROLEUM EQUIPMENT & TECHNOLOGIES CO., LTD., Yantai (CN)

(72) Inventors: Peng Zhang, Yantai (CN); Rikui Zhang, Yantai (CN); Xiaolei Ji, Yantai (CN); Mingchao Mao, Yantai (CN); Zhuqing Mao, Yantai (CN); Jihua Wang, Yantai (CN); Jianwei Wang, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 16/874,827

(22) Filed: May 15, 2020

(30) Foreign Application Priority Data

Jan. 7, 2020 (CN) .......................... 2020 1 0013728

(51) Int. Cl.
| | | |
|---|---|---|
| *B01D 49/00* | (2006.01) | |
| *E21B 43/26* | (2006.01) | |
| *B01D 46/42* | (2006.01) | |
| *F02C 7/055* | (2006.01) | |
| *B01D 46/00* | (2006.01) | |
| *B01D 46/10* | (2006.01) | |
| *B01D 46/52* | (2006.01) | |

(52) U.S. Cl.
CPC .......... *E21B 43/2607* (2020.05); *B01D 46/42* (2013.01); *F02C 7/055* (2013.01); *B01D 46/0005* (2013.01); *B01D 46/0023* (2013.01); *B01D 46/0086* (2013.01); *B01D 46/10* (2013.01); *B01D 46/521* (2013.01); *B01D 2279/60* (2013.01)

(58) Field of Classification Search
CPC ..... E21B 43/2607; F02C 7/055; B01D 46/42; B01D 2279/60; B01D 46/0086; B01D 46/0005; B01D 46/521; B01D 46/10; B01D 46/0023
See application file for complete search history.

(56) References Cited

U.S. PATENT DOCUMENTS

| | | | | |
|---|---|---|---|---|
| 2011/0118967 | A1* | 5/2011 | Tsuda ................... | B60W 30/10 701/117 |
| 2014/0042199 | A1* | 2/2014 | Gregory, Jr. ............. | B60R 7/02 224/401 |
| 2015/0205006 | A1* | 7/2015 | Maerten ............... | G01V 99/005 703/2 |
| 2017/0052070 | A1* | 2/2017 | Marsh .................... | G01N 25/72 |
| 2017/0203241 | A1* | 7/2017 | Subedi ................. | B01D 46/442 |

\* cited by examiner

*Primary Examiner* — Dung H Bui

(57) ABSTRACT

Disclosed is an air source system for supplying air to a turbine engine by fracturing manifold equipment, including an air supply device, an air delivery manifold, a filtering device, a gas detecting system and a connecting device, the air delivery manifold, the filtering device and the gas detecting system are integrated on the fracturing manifold equipment, the air supply device is connected to the air delivery manifold through the filtering device, and the air delivery manifold supplies air to the turbine engine through the connecting device. Beneficial effects: avoiding the hidden danger of the high pressure region, saving the floor space, avoiding the wiring of on-site delivery manifold, enhancing the connection efficiency, and reducing the difficulty of wellsite installation.

4 Claims, 1 Drawing Sheet

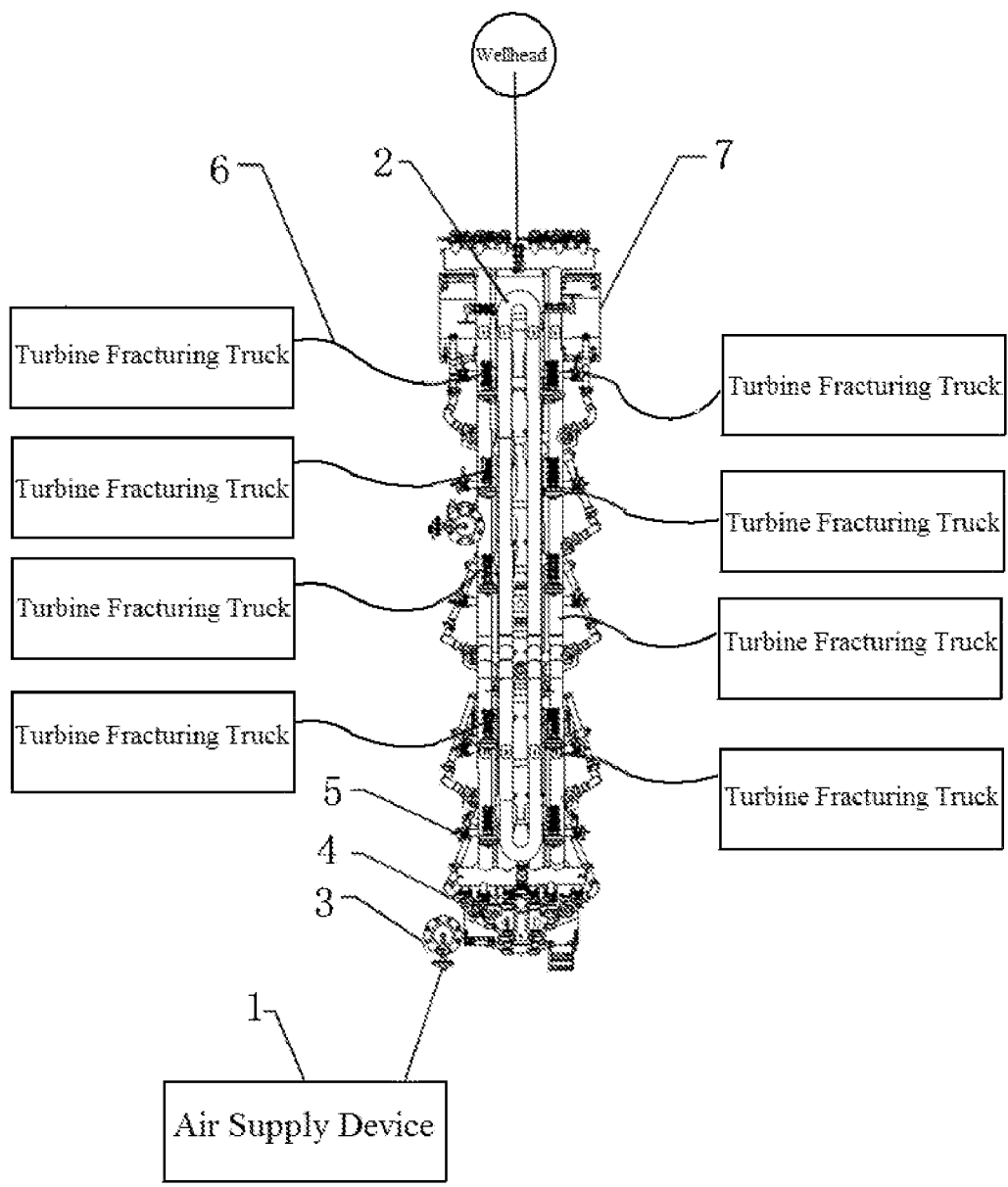

AIR SOURCE SYSTEM FOR SUPPLYING AIR TO A TURBINE ENGINE BY FRACTURING MANIFOLD EQUIPMENT

TECHNICAL FIELD

The present invention relates to the technical field of turbine fracturing, and particularly relates to an air source system for supplying air to a turbine engine by fracturing manifold equipment.

BACKGROUND

For recent decades, hydraulic fracturing has been used to increase the production in oil or gas wells. In this process, a fracturing pump is used to pump the fluid into a wellbore under high pressure, then the fluid is squeezed into the formation, fracturing several hydraulic fractures. Water, other liquids as well as fracturing proppants are also injected into the fractures. After fracturing, the fracturing base fluid is returned to the ground, with the fracturing proppants remaining in the fractures to prevent fracture closure, through which a large amount of oil and gas enter the wellbore to be exploited.

In the working sites of fracturing in oil and gas fields all over the world, the air source supply for turbine fracturing is as follows:

The turbine fracturing trucks are arranged side by side, air pipelines are connected between the turbine fracturing trucks, air filters are disposed at the position of accessories of the turbine fracturing trucks, and the whole air piping is arranged around the vehicle set.

The problems are as follows:

1. Unsafety: The air filters are disposed at the rear of the turbine fracturing trucks, which is a high pressure region, with a risk of damaging the filters; moreover, the protection of most air filters is not safe enough, once the high-pressure pipeline leaks, the air supply will be disconnected, finally affecting the efficiency of the wellsite.

2. Unreasonable arrangement: The air pipeline for the whole vehicle set is in an annular form, if one of turbine fracturing trucks has to drive away, the piping for the whole vehicle set would be broken, with a risk of cutting off the air, thus affecting the efficiency of the wellsite.

3. Incompact structure, labor and time-consuming of installation: It is necessary to temporarily install air filters, air pipelines and other materials after the wellsite arrangement has been completed, increasing the difficulty of wellsite installation and affecting the operating efficiency.

SUMMARY

To overcome the deficiencies in the prior art, an objective of the present invention is to provide an air source system for supplying air to a turbine engine by fracturing manifold equipment, wherein the air delivery manifold and the filtering device are integrated on the manifold equipment at the fracturing site, avoiding the on-site wiring of the air delivery manifold in the prior art, saving the installation time, reducing the difficulty of wellsite installation, and enhancing the installation efficiency; the change in the location of the filtering device also eliminates the hidden danger of the high pressure region at the rear of the turbine fracturing truck in the prior art; the connecting device enables more flexible air supply, changing from air supply in series between turbine fracturing truck sets in the prior art to air supply in parallel, so that the movement of a single turbine fracturing truck does not affect the air supply of other turbine fracturing trucks, it is only necessary to shut off the valve and disconnect the fast interface; the guard is set to isolate the fracturing manifold from the air delivery manifold, increasing the safety.

The objective of the present invention is achieved by the following technical measures: An air source system for supplying air to a turbine engine by fracturing manifold equipment, including an air supply device, an air delivery manifold, a filtering device, a gas detecting system and a connecting device, the air delivery manifold, the filtering device and the gas detecting system are integrated on the fracturing manifold equipment, the air supply device is connected to the air delivery manifold through the filtering device, and the air delivery manifold supplies air to the turbine engine through the connecting device.

Further, the air source system for supplying air to a turbine engine by fracturing manifold equipment includes a guard, the guard is integrated on the fracturing manifold equipment and is used to isolate the air delivery manifold from the fracturing manifold on the fracturing manifold equipment.

Further, the guard is an isolating board.

Further, the guard is made of steel.

Further, the gas detecting system is a laser gas detecting system.

Further, the gas detecting system is a pan-and-tilt laser gas detecting system.

Further, the pan-and-tilt laser gas detecting system includes multiple scanning laser gas telemeters, and the pan-and-tilt drives the scanning laser gas telemeters to detect multi-dimensional space on site in real time.

Further, the connecting device includes a connecting pipeline, a valve and a fast interface, the valve is used for the on-off of air supply of the connecting pipeline, and the fast interface is used for the fast connection between the connecting pipeline and the turbine engine.

Compared with the prior art, the present invention has the following beneficial effects: An air source system for supplying air to a turbine engine by fracturing manifold equipment, wherein the air delivery manifold and the filtering device are integrated on the manifold equipment at the fracturing site, avoiding the on-site wiring of the air delivery manifold in the prior art, saving the installation time, reducing the difficulty of wellsite installation, and enhancing the installation efficiency; the change in the location of the filtering device also eliminates the hidden danger of the high pressure region at the rear of the turbine fracturing truck in the prior art; the connecting device enables more flexible air supply, changing from air supply in series between turbine fracturing truck sets in the prior art to air supply in parallel, so that the movement of a single turbine fracturing truck does not affect the air supply of other turbine fracturing trucks, it is only necessary to shut off the valve and disconnect the fast interface; the guard is set to isolate the fracturing manifold from the air delivery manifold, increasing the safety.

The present invention will be described in detail below with reference to the accompanying drawings and specific implementations.

BRIEF DESCRIPTION OF THE DRAWINGS

FIG. 1 is a schematic structural diagram of an air source system for supplying air to a turbine engine by fracturing manifold equipment according to an embodiment of the invention.

Wherein, 1. air supply device, 2. air delivery manifold, 3. filtering device, 4. gas detecting system, 5. guard, 6. connecting device, 7. fracturing manifold equipment.

DESCRIPTION OF THE EMBODIMENTS

As shown in FIG. 1, an air source system for supplying air to a turbine engine by fracturing manifold equipment, including an air supply device 1, an air delivery manifold 2, a filtering device 3, a gas detecting system 4 and a connecting device 6, wherein the air delivery manifold 2, the filtering device 3 and the gas detecting system 4 are integrated on the fracturing manifold equipment 7, the air supply device 1 is connected to the air delivery manifold 2 through the filtering device 3, and the air delivery manifold 2 supplies air to the turbine engine through the connecting device 6. In the actual fracturing working site, the fracturing manifold equipment 7 is located near the wellhead for delivering the fracturing fluid in the fracturing equipment into the wellhead. The engine of the fracturing equipment is powered by a plunger pump, which pumps the fracturing fluid into the wellhead. In the actual site location, the fracturing equipment is also located around the fracturing manifold equipment 7. In this technical solution, the engine of the fracturing equipment is a turbine engine. The air delivery manifold 2 and the filtering device 3 are integrated on the manifold equipment at the fracturing site, avoiding the on-site wiring of the air delivery manifold 2 in the prior art, saving the installation time, reducing the difficulty of wellsite installation, enhancing the installation efficiency, and decreasing the floor space of the air delivery manifold 2 and the filtering device 3 in the prior art; the location of the filtering device 3 is changed from the high pressure region at the rear of the turbine fracturing truck in the prior art to the fixed location on the fracturing manifold equipment 7, also eliminating the hidden danger of the filtering device 3.

The air source system for supplying air to a turbine engine by fracturing manifold equipment includes a guard 5, the guard 5 is integrated on the fracturing manifold equipment 7 and is used to isolate the air delivery manifold 2 from the fracturing manifold on the fracturing manifold equipment 7. The guard 5 is set to isolate the fracturing manifold from the air delivery manifold 2, enabling the safety protection on the natural gas and high-pressure fracturing fluid, and enhancing the safety of the wellsite. The guard 5 is an isolating board.

The guard 5 is made of steel.

The gas detecting system 4 is a laser gas detecting system.

The gas detecting system 4 is a pan-and-tilt laser gas detecting system.

The pan-and-tilt laser gas detecting system includes multiple scanning laser gas telemeters, the intelligent pan-and-tilt drives the scanning laser gas telemeter to rotate 360° horizontally and 180° vertically, enabling the detection of multi-dimensional space on site in real time. The intelligent adjustment function of the pan-and-tilt laser gas detecting system can focus on the key detection areas, and the camera captures the scene pictures synchronously, achieving the basic positioning of missing areas. Meanwhile, the real-time detection data is transmitted to the background analysis system, realizing early detection, early warning and early handling of hidden dangers, greatly improving the safety protection level of the wellsite.

The connecting device 6 includes a connecting pipeline, a valve and a fast interface, the valve is used for the on-off of air supply of the connecting pipeline, and the fast interface is used for the fast connection between the connecting pipeline and the turbine engine. The connecting device 6 enables more flexible air supply, changing from air supply in series between turbine fracturing truck sets in the prior art to air supply in parallel, so that the movement of a single turbine fracturing truck does not affect the air supply of other turbine fracturing trucks, it is only necessary to shut off the valve and disconnect the fast interface.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention, which is defined by the appended claims and equivalents thereof.

What is claimed is:

1. An air source system for supplying air to a turbine engine by fracturing manifold equipment, comprising an air supply device, an air delivery manifold, a filtering device, a gas detecting system and a connecting device, the air delivery manifold, the filtering device and the gas detecting system are integrated on the fracturing manifold equipment, the air supply device is connected to the air delivery manifold through the filtering device, and the air delivery manifold supplies air to the turbine engine through the connecting device wherein the air source system for supplying air to a turbine engine by fracturing manifold equipment comprises a guard, the guard is integrated on the fracturing manifold equipment and is used to isolate the air delivery manifold from the fracturing manifold on the fracturing manifold equipment; wherein the gas detecting system is a pan-and-tilt laser gas detecting system comprises multiple scanning laser gas telemeters, and the pan-and-tilt drives the scanning laser gas telemeters to detect multi-dimensional space on site in real time.

2. The air source system for supplying air to a turbine engine by fracturing manifold equipment according to claim 1, wherein the guard is an isolating board.

3. The air source system for supplying air to a turbine engine by fracturing manifold equipment according to claim 2, wherein the guard is made of steel.

4. The air source system for supplying air to a turbine engine by fracturing manifold equipment according to claim 1, wherein the connecting device comprises a connecting pipeline, a valve and a fast interface, the valve is used for the on-off of air supply of the connecting pipeline, and the fast interface is used for the fast connection between the connecting pipeline and the turbine engine.

* * * * *